T. M. FINLEY.
GAS CONTROL FOR FLYING MACHINES.
APPLICATION FILED AUG. 26, 1918.

1,426,370.

Patented Aug. 22, 1922.
8 SHEETS—SHEET 1.

Inventor
Thomas M. Finley
By
Attorneys

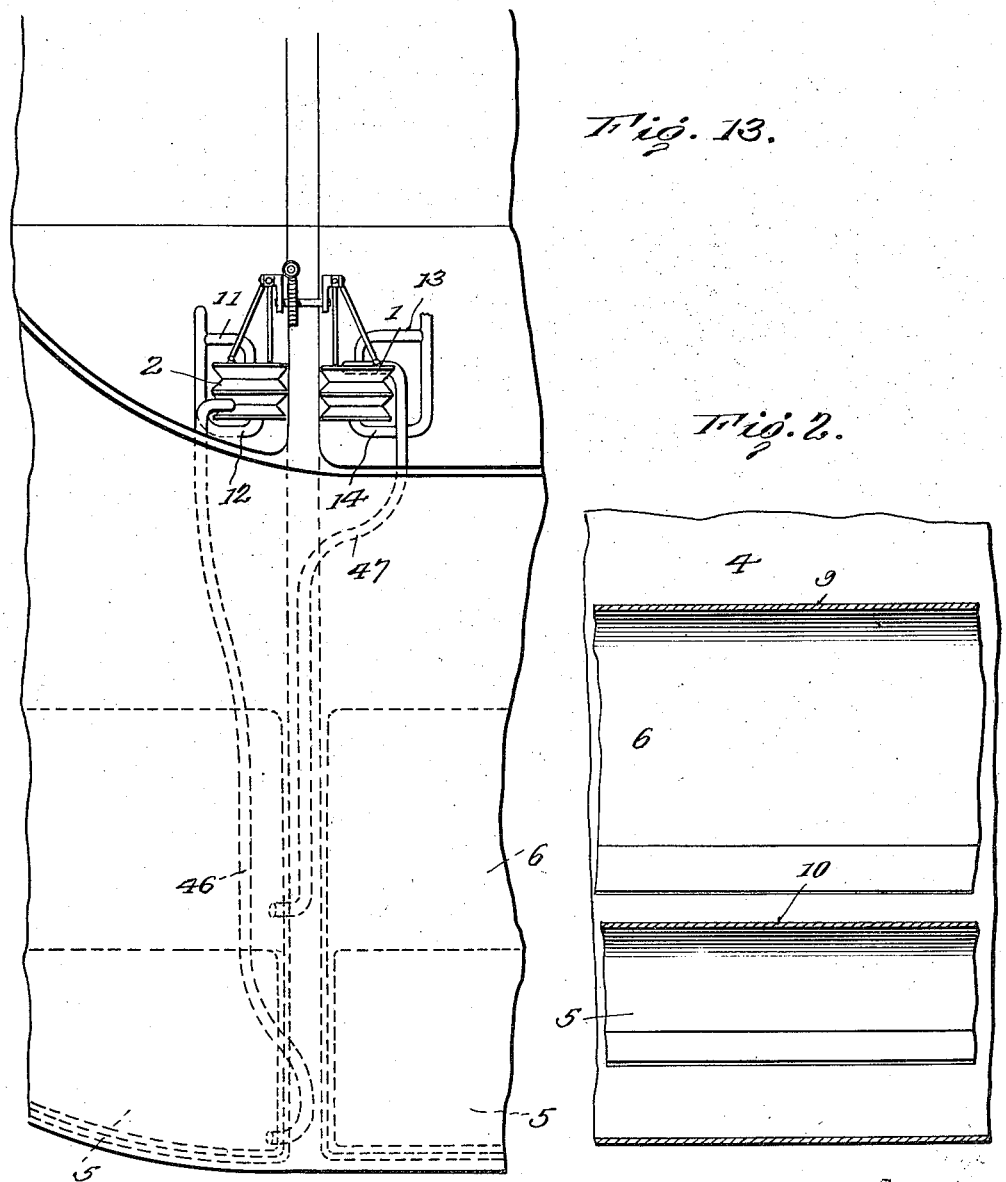

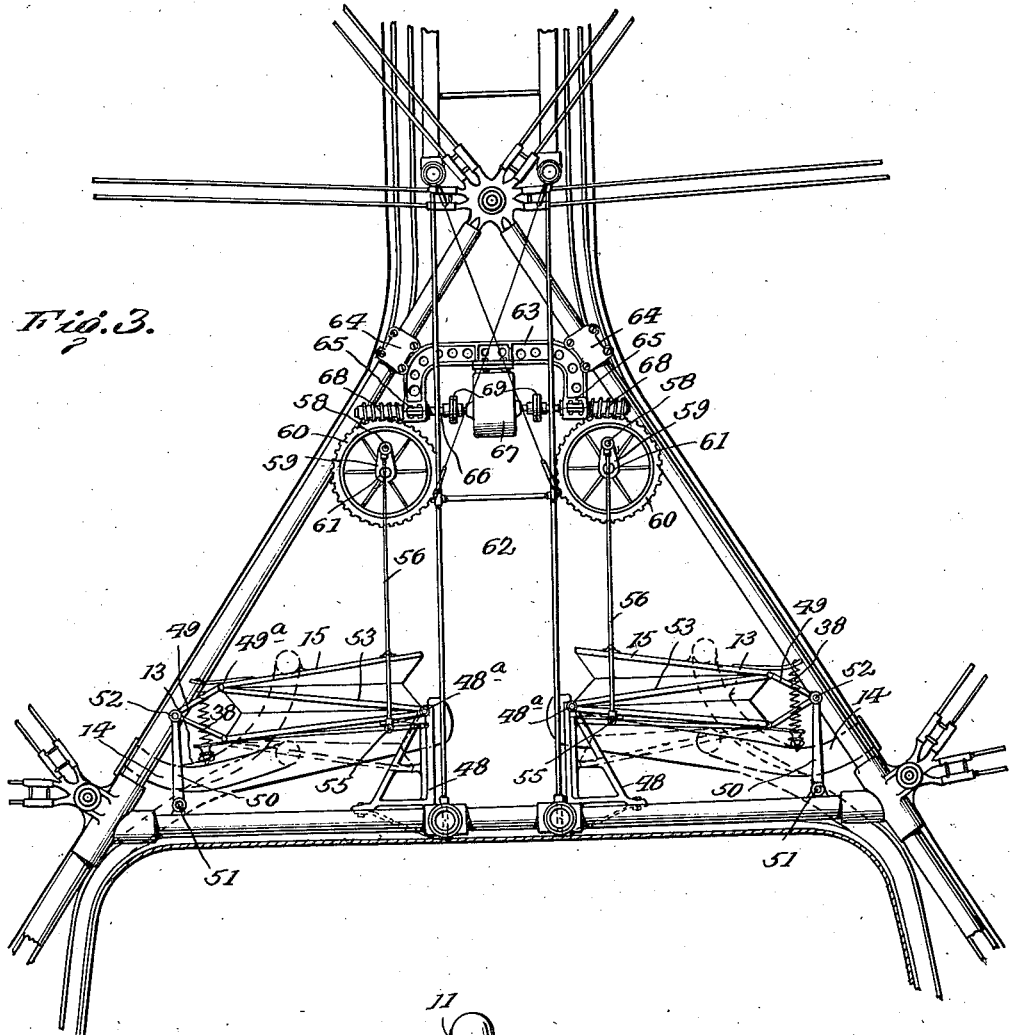
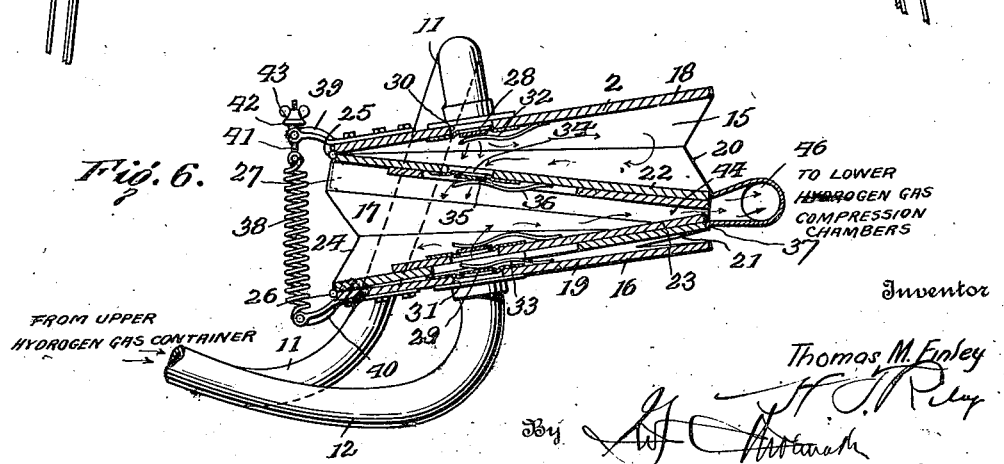

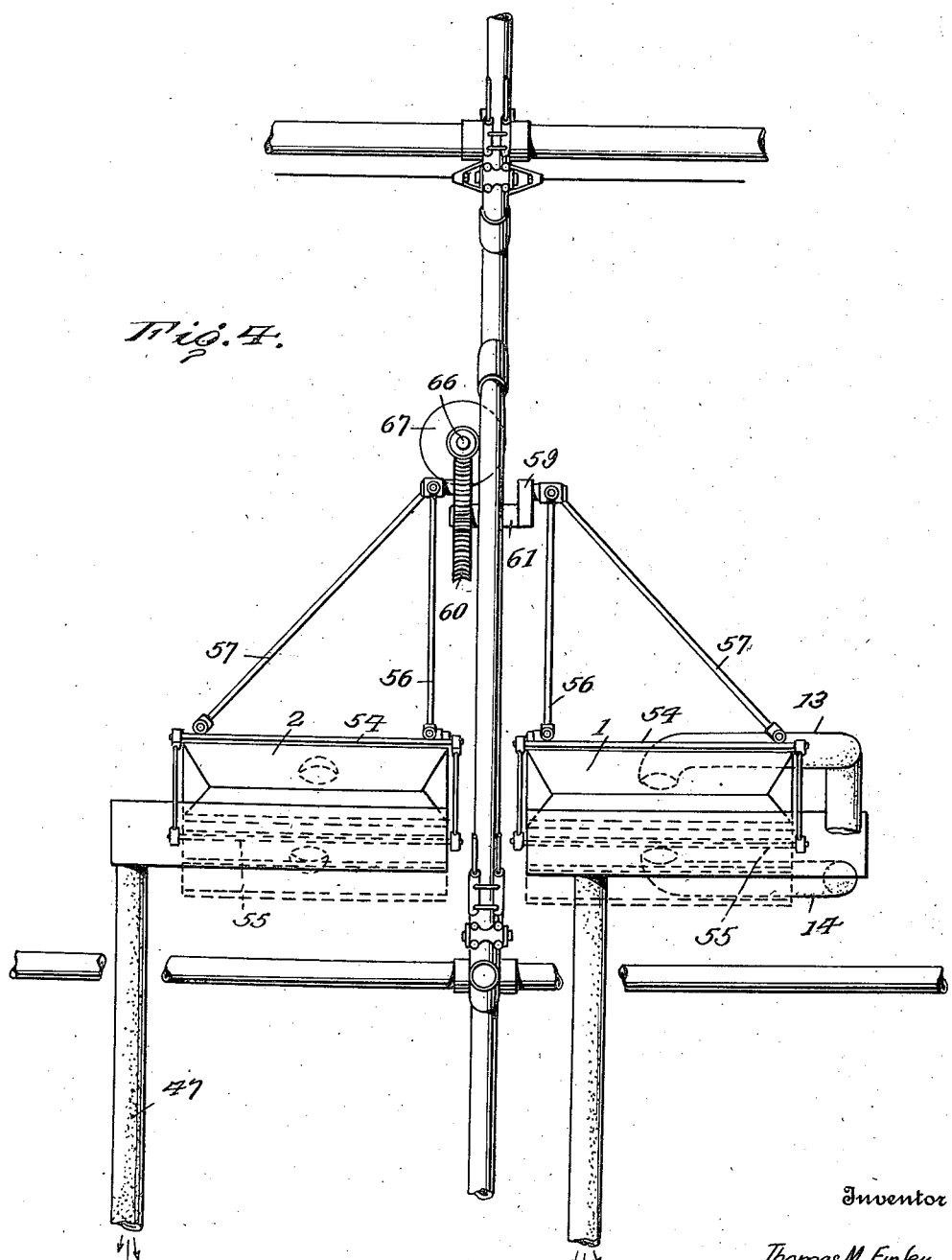

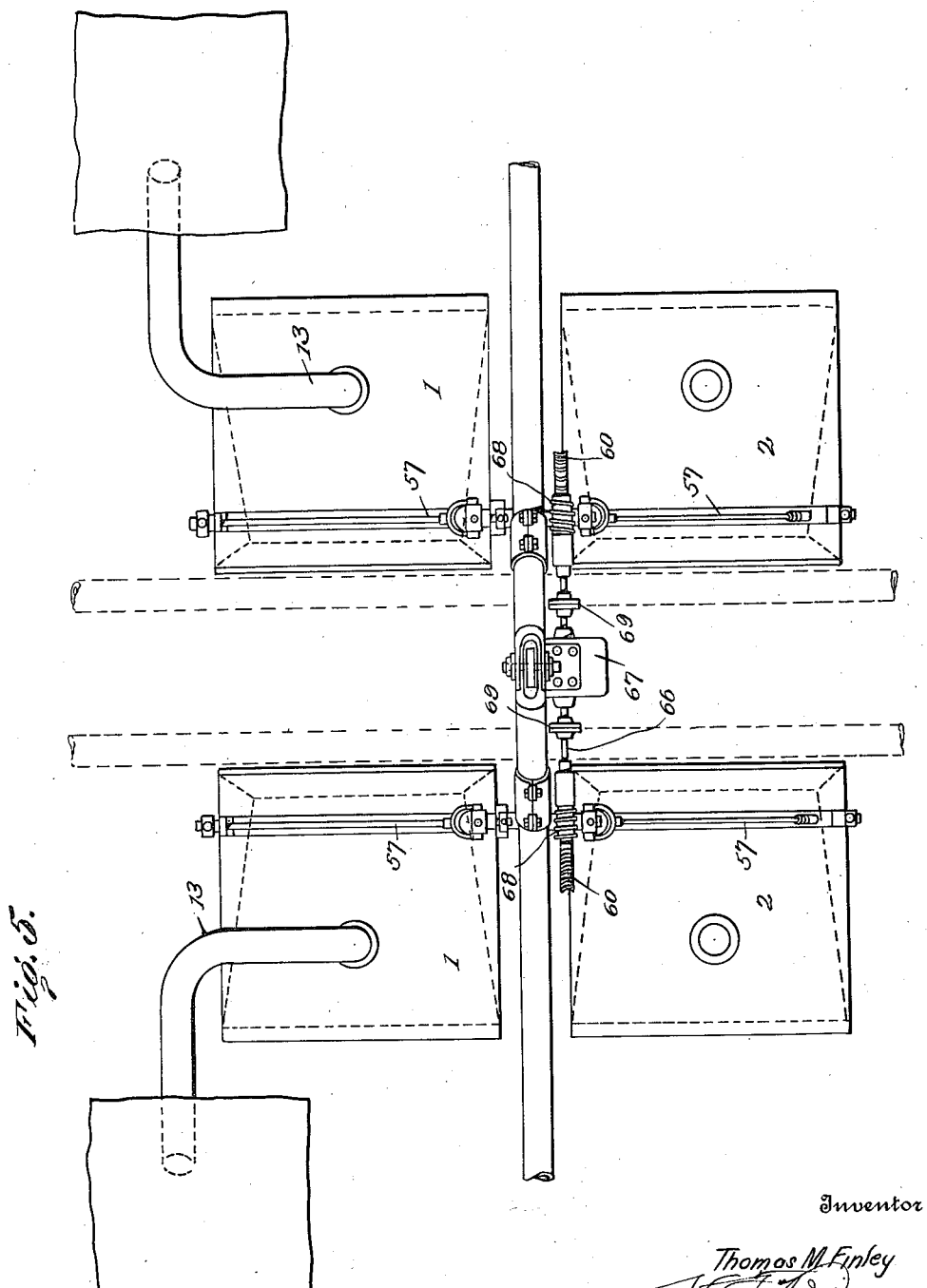

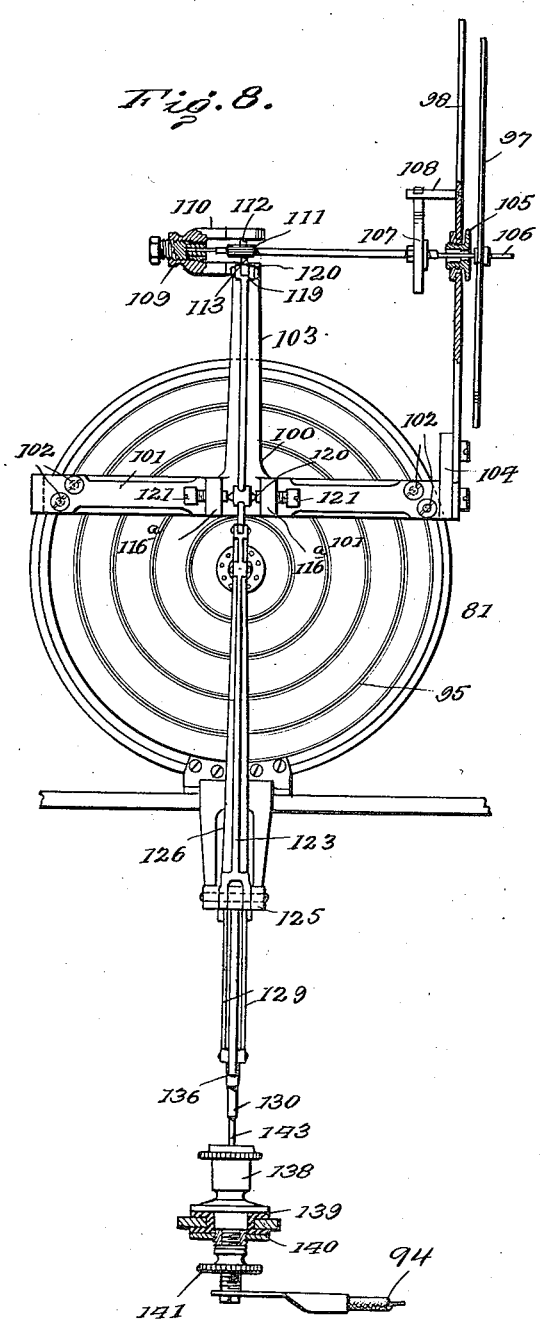
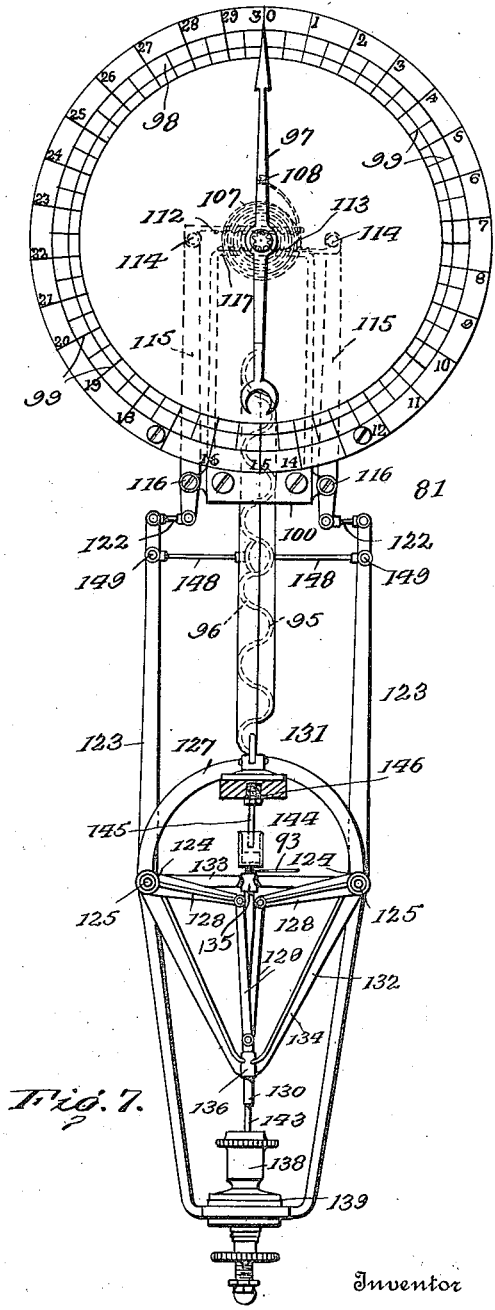

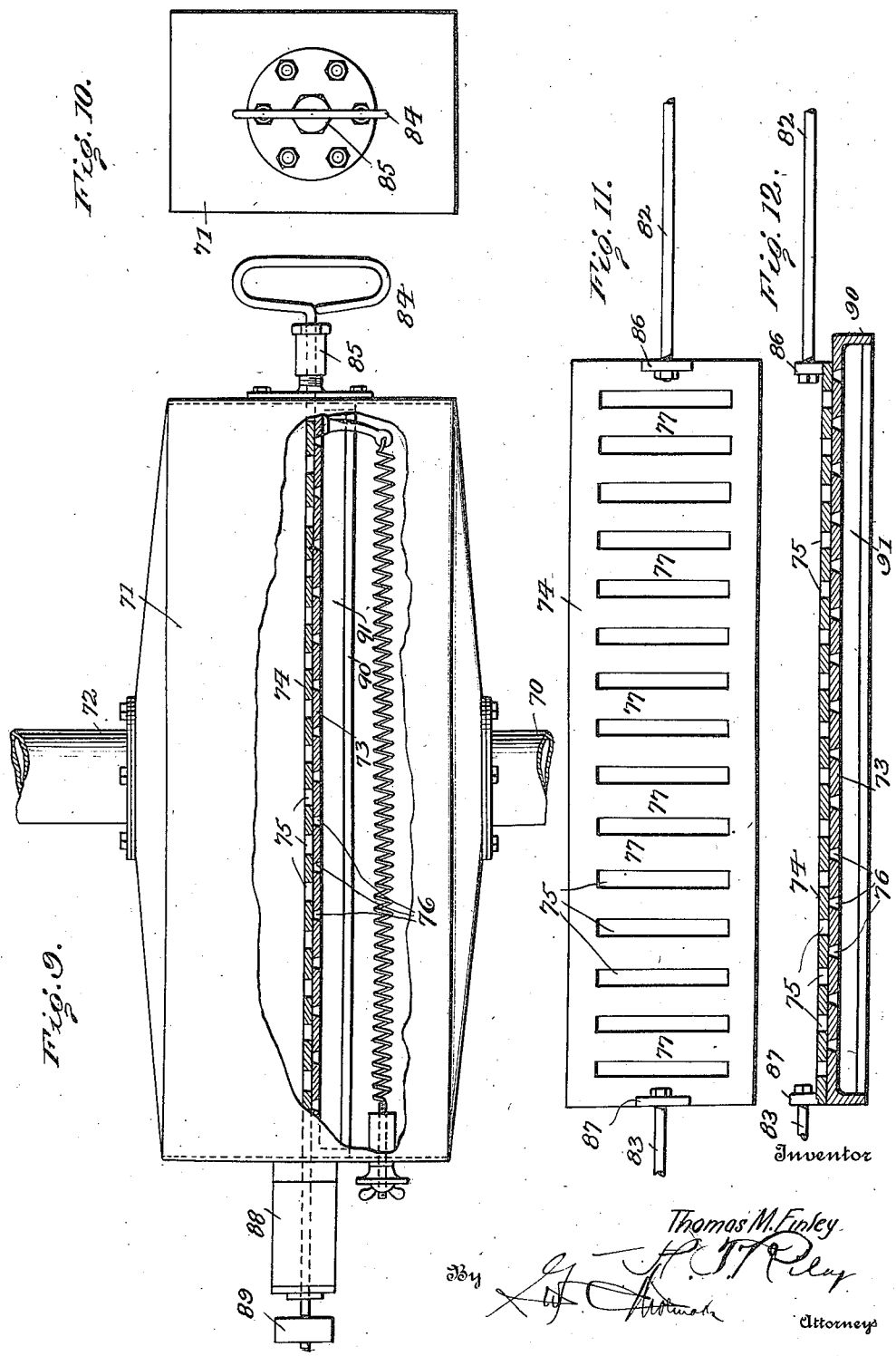

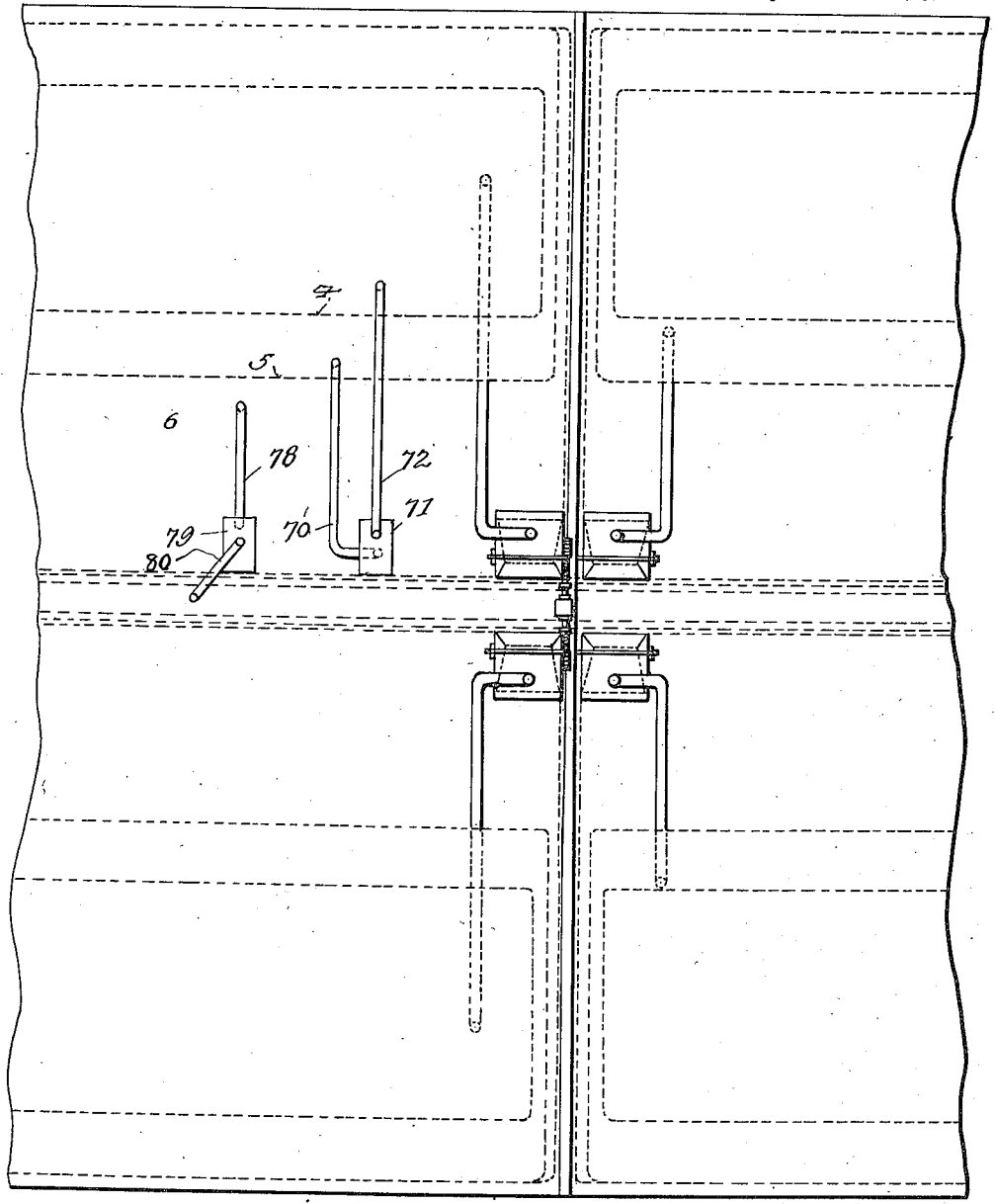

UNITED STATES PATENT OFFICE.

THOMAS M. FINLEY, OF ST. LOUIS, MISSOURI.

GAS CONTROL FOR FLYING MACHINES.

1,426,370.  Specification of Letters Patent.  Patented Aug. 22, 1922.

Application filed August 26, 1918. Serial No. 251,586.

*To all whom it may concern:*

Be it known that I, THOMAS M. FINLEY, a citizen of the United States, residing at St. Louis, in the county of St. Louis City and State of Missouri, have invented certain new and useful Improvements in Gas Controls for Flying Machines, of which the following is a specification.

This invention relates to a gas controlling means for flying machines and is a continuation in part of a co-pending application filed by me the 20th day of July, 1918, Serial Number 245,885.

The object of the present invention is to provide for that type of flying machines which is equipped with gas for lifting purposes, a gas controlling means adapted when it is desired to ascend or descend or to vary the lifting effect of the gas of a flying machine for any other purpose, to enable the gas to be withdrawn to reduce the lifting effect and compressed to add ballast to the machine or to be released from such compressed condition and returned to the gas bag or container for increasing the lifting power of the machine.

A further object of the invention is to provide gas controlling means of this character adapted to enable a flying machine to ascend or descend as often as desired or required in a flight without returning to the base or other point for replenishing its hydrogen gas and without material loss of gas or ballast so that in the control of the flying machine it will not be necessary to carry ballast to be discharged to enable the machine to ascend to its highest altitude or require a discharge of the gas into the atmosphere to descend after reaching such altitude which limit the machine to a single extreme ascent and frequently through a too great escape of the gas cause an uncontrollable descent of the machine to the ground at an undesirable point.

Another object of the invention is to provide gas controlling means adapted to pump gas from the gas bag or container into a gas compression chamber and air from the atmosphere into an inflatable air chamber, thereby reducing the lifting capacity of the machine and simultaneously adding ballast by the compression of the gas and the introduction of the air which not only adds ballast but also fills substantially the cubic space occupied by the gas withdrawn from the gas bag or container to prevent any alteration in the size or shape of the gas bag or container.

Another object of the invention is to enable the compressed gas to be readily released from the compression chamber and returned to the gas bag or container simultaneously with releasing of the air from the air chamber and the deflation of the air chamber and the gas compression chamber so that the gas returned to the gas bag or container will occupy the space previously occupied by the air chamber and the gas compression chamber to restore to the machine its maximum lifting effect.

It is also an object of the invention to enable the gas controlling means to be operated by an adjustable aneroid barometer and adapted to maintain the flying machine automatically at a predetermined elevation within certain limits and capable in event of the machine ascending beyond the predetermined altitude of automatically operating the pumps to reduce the amount of gas within the gas containers and increase the ballast and adapted also in event of the flying machine descending below the predetermined altitude of automatically operating controlling valves to return the compressed hydrogen gas from the gas compression chamber to the gas bag or container to increase the lifting capacity to the required degree thereby enabling machines of this type to fly with safety at different predetermined altitudes without danger of collision between machines traveling in different directions and crossing the path of each other, and also permitting machines to drop heavy bombs at selected points without change of ballast conditions.

Another object of the invention is to provide a gas control adapted to be manually operated when desired to return the compressed gas from the gas compression chambers to the gas bags or containers when required.

With these and other objects in view, the invention consists in the construction and novel combination and arrangement of parts hereinafter fully described, illustrated in the accompanying drawings and pointed out in the claims hereto appended, it being understood that various changes in the form, proportion, size and minor details of construction, within the scope of the claims, may be resorted to without departing from the spirit or sacrificing any of the advantages of the invention.

In the drawings:

Figure 2 is a detail longitudinal seectional view through the gas bag or container and the air and gas compression chambers.

Figure 3 is an enlarged detail side elevation of the pumping mechanism.

Figure 4 is an end elevation of the same.

Figure 5 is a plan view of the air and gas pumps.

Figure 6 is an enlarged sectional view through one of the pumps.

Figure 7 is a front elevation of the adjustable aneroid barometer.

Figure 8 is a side elevation of the same.

Figure 9 is a detail side view, partly in section, illustrating the construction of the valve box.

Figure 10 is an end elevation of the same.

Figure 11 is a detail view of the valve shutter or member.

Figure 12 is a longitudinal sectional view of the valve shutter or member and the slotted seat.

Figure 13 is a plan view illustrating the arrangement of the pumps and the valve boxes.

Figure 14 is a plan view illustrating the arrangement of the pumps and the valve boxes.

Figure 1:
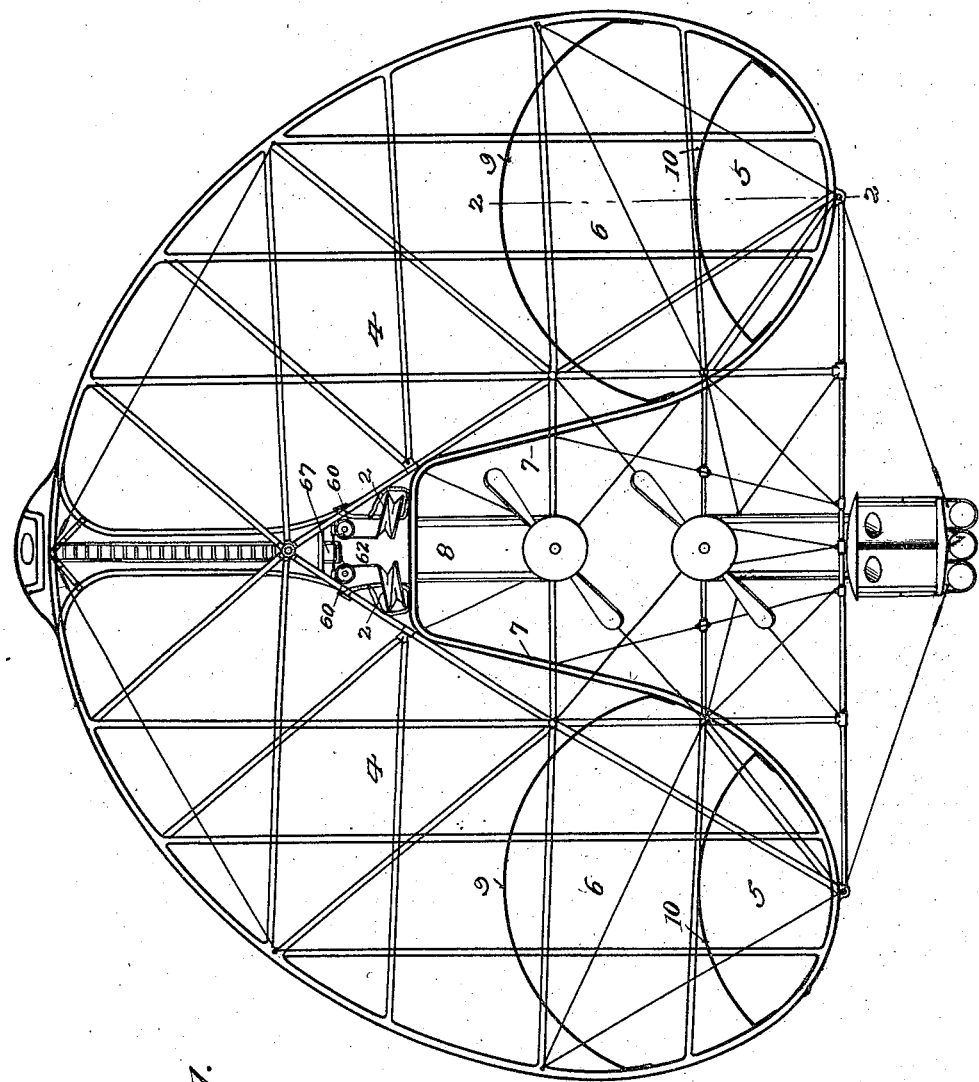
Figure 1 is a transverse sectional view of a flying machine provided with a gas control constructed in accordance with this invention.

In the accompanying drawings is illustrated one embodiment of the invention and the gas control which is designed primarily for flying machines of the Finley type such as is shown and described in the aforesaid application. It may, of course, be advantageously employed in all types of such machines in which gas is employed for lifting purposes and where it is necessary to reduce the amount of gas to descend and increase the amount of the same to ascend as it will enable the effective volume of gas in a machine to be varied as required without loss of the gas except the small unavoidable leakage as it will enable flying machines through such variation in the effective volume of gas to ascend and descend as often as required in a single flight without return to a base or other point of supply. The gas control comprises gas and air pumps 1 and 2 which are shown in the accompanying drawings as double acting bellows pumps but which may of course be of any other type or construction and which are adapted in their operation to pump hydrogen gas from the hydrogen gas containers 4 into hydrogen gas compression chambers 5 and simultaneously pump air from the atmosphere into air chambers 6 to reduce the effective volume of hydrogen gas and increase the ballast. It will be noted that the air chambers and the hydrogen gas compression chambers as described in the aforesaid application are located within the hydrogen gas containers so that the size and shape of the same are not varied; that by withdrawing the hydrogen gas from the hydrogen gas containers and pumping the same in compressed form into the hydrogen gas compression chambers and the pumping of air into the air chambers reduces the effective volume of hydrogen gas and the lifting power of the machine and simultaneously adds ballast to the same and that by releasing the compressed gas from the hydrogen gas compression chambers and returning the same to the hydrogen gas containers and also removing the air from the air chambers the effective volume of hydrogen gas and the lifting power of the machine are increased and the added ballast decreased or entirely removed. It is therefore unnecessary to carry ballast to be discharged to enable the machine to ascend and it is not necessary to discharge the gas into the air to cause the machine to descend.

The hydrogen gas containers are located at opposite sides of the body of the machine which is substantially segmental in cross section and which has depending side wings 7 and an intervening trough 8 as shown and described in the aforesaid application. The hydrogen gas and air compression chambers are formed by flexible diaphragms or partitions 9 and 10 connected at their side edges with the hydrogen gas container at the inner and outer sides of the wings and adapted when the hydrogen gas compression chambers and the air chamber are deflated to lie against the walls of the hydrogen gas cotnainers at the bottom portions of the wings in order that the effective volume of the hydrogen gas may fill the entire cubic space within the hydrogen gas containers. Any other suitable construction and arrangement of the hydrogen gas compression chambers and air chambers and also hydrogen gas containers may of course be employed.

The pumps are preferably arranged in pairs as clearly illustrated in Figure 5 of the drawings and the gas pumps are connected by flexible tubes 11 and 12 with the hydrogen gas containers and they preferably extend to the upper portions of the said containers where the hydrogen gas is at its maximum pressure so that the pressure of the gas will in the operation of the pumps expand the bellows of the same and thereby assist in the pumping action. The air pumps are also connected by flexible tubes 13 and 14 leading from the top and bottom of the air pumps to the atmosphere.

Each of the double bellows pumps comprises upper and lower bellows 15 and 16 and an intermediate bellows 17 constituting a compression bellows and communicating with either a hydrogen gas compression chamber or an air chamber for forcing either air or gas under pressure into said chamber as the case may be. The upper and lower pump bellows 15 and 16 are composed of outer plates or members 18 and 19 and flexible bellows cloths 20 and 21 and the intermediate bellows is composed of upper and lower plates or members 22 and 23 and a connecting bellows cloth at 24. The plates or members and the bellows cloths may be constructed of any suitable material and the upper and lower plates or members 18 and 19 are connected at one end by suitable hinges 25 and 26 with the upper and lower members 22 and 23 at one end thereof. The upper member or plate 22 forms the top wall of an inverted casing 27 which has side and end walls depending from the said plate or member 22. The upper and lower pump bellows are equipped with inwardly opening valves 28 and 29 controlling valve openings 30 and 31 which communicate with the upper and lower inlet tubes of the pump. The inlet valves may be of any desired construction and they are urged to their closed position by springs 32 and 33. The upper and lower members 22 and 23 of the intermediate pump bellows is also provided with valve openings 34 controlled by inwardly opened valves 35 which are urged to their closed position by springs 36. In Figure 6 of the drawings the upper bellows of the pump and the intermediate bellows of the same are shown opened or distended while the lower pump bellows is shown closed, the upper and lower pump bellows being alternately opened and closed by the operating mechanism hereinafter described. The upper and lower plates or members of the intermediate bellows of the pump are connected by a hinge 37 which secures the lower plate or member 23 to the casing of the upper plate or member 22 at the end of the pump opposite that at which the upper and lower members 18 and 19 are hinged to the members 22 and 23. The intermediate bellows opens against the action of an adjustable tension spring 38 which is shown distended in Figure 6 of the drawings and which is adapted to close substantially the intermediate bellows for expelling the gas therefrom. The tension spring 38 is connected to arms 39 and 40 secured to and extending from the upper and lower plates or members 18 and 19 at the hinged plates thereof. One end of the coiled spring is connected directly to the outer end of the arm 40 and the other end of the said spring is adjustably connected with the arm 39 by means of a screw 41 piercing the arm 39 and equipped with an adjusting nut 42 and a locking nut 43 for clamping the nut 42 in its adjustment. The screw is adapted to be adjusted to vary the tension of the spring 38 and the gas or air is pumped into the intermediate bellows chamber against the pressure of the spring and by adjusting the latter the pressure of the air or gas delivered to the hydrogen gas compression chamber or the air chamber may be controlled. The intermediate bellows of the pump is provided with an outlet 44 and the gas pumps are connected by suitable tubes 46 with the gas compression chambers and the air pumps are connected by suitable tubes 47 with the air chamber so that in the operation of the pumps the gas and air under pressure are taken into the said chambers.

The bellows pumps are pivotally mounted at one end on suitable supporting brackets 48 at 48ª and any suitable pivotal connection may of course be employed for this purpose. The pump is also connected at the opposite end by converging links 49 with rocker arms 50 arranged in substantially vertical position and pivoted at their lower ends at 51 and adapted to swing laterally with the opening and closing movement of the intermediate bellows of the pumps. The converging links are pivoted at their adjacent ends to the upper ends of the rocker arms at 52 and their other ends are pivotally connected with the upper and lower members 22 and 23 of the intermediate bellows at 49ª and any suitable pivotal connection may of course be provided for this purpose. The rocker arms and the links support one end of the pump and are adapted to yield to the action of the intermediate bellows.

The members 18 and 19 of the upper and lower bellows are connected adjacent their upper ends by side links 53 located at opposite sides of the bellows pumps and having their terminals pierced by upper and lower transverse rods 54 and 55. The upper rod 54 is connected adjacent its ends by vertical and inclined links 56 and 57 with a wrist pin 58 of a crank 59 or a worm wheel 60 mounted on a short shaft 61 and located at the ends thereof. The pairs of pumps are located at opposite sides of the space or passage 62 of the body of the flying machine, but they may be located at any other convenient point and the said shafts 61 are journaled in suitable bearings of the side portions of an approximately inverted U-shaped hanger 63 secured at opposite sides of its top portion to the frame work of the machine by a clamp 64 and provided also at opposite sides with bearings 65 for the reception of a shaft 66 of an electric motor 67 hung from and suitably secured to the center of the top of the U-shaped hanger, but any other suitable power may be employed for operating the pumps. The motor shaft is provided at its end with right and left hand worms 68 which mesh with the worm wheels 60 and which equalize the end thrust on the motor shaft. The motor shaft is designed to be equipped at opposite sides of the motor with balance wheels 69 and the worm wheels are located at opposite sides of the passage way 62 above the bellows pumps and when the motor is in operation rotary motion is communicated to the worm wheels and the bellows pumps are vibrated to alternately open and close the upper and lower pump bellows, the opening movement or inflation of the upper and lower pump bellows of the gas pumps being assisted by the pressure of the gas within the gas containers.

Each hydrogen gas compression chamber is connected by a tube or conduit 70 with the bottom of a valve box 71 connected at the top by a tube or conduit 72 with the hydrogen gas container and equipped with a valve seat 73 and a slidable valve shutter or member 74 having transverse slots 75 and adapted to be moved longitudinally to carry the slots 75 into and out of register with slots 76 in the valve seats. The valve seat consists of a horizontal plate or partition arranged centrally of the valve box and extending longitudinally thereof to divide the valve box into upper and lower chambers and the said slots 76 are preferably tapered upwardly as shown and are arranged transversely. The intervening solid portions 77 between the slots 75 of the valve shutter or member are of sufficient size to cover completely and close the slots 76 of the valve seat for confining the compressed gas within the hydrogen gas compression chamber and to cut the same off from the hydrogen gas container and the said valve shutter or member is adapted to be operated to open the valve and release the compressed hydrogen gas within the compression chamber and permit such compressed gas to return to the hydrogen gas container. Each of the air chambers is connected by a tube or conduit 78 with a valve box 79 constructed the same as that heretofore described and connected by a tube or conduit 80 with the atmosphere so that when the valves or the valve boxes are opened to release the compressed hydrogen gas the latter returning to the hydrogen gas container will deflate the air chamber and the hydrogen gas compression chamber and force the flexible walls or diaphragms thereof against the bottom of the hydrogen gas container and entirely fill the latter. The valve boxes and the pump motors are adapted to be controlled automatically by the aneroid barometer 81 hereinafter described to maintain the flying machine at the predetermined altitude of flight by retaining the required volume of gas within the hydrogen gas containers for this purpose and when the flying machine through a reduction in its weight, for instance by the discharge of heavy bombs has a tendency to rise beyond such predetermined altitude of flight, the pumps will be operated to reduce the volume of hydrogen gas within the gas containers and increase the volume of air within the air chambers and the amount of compressed gas within the hydrogen gas compression chambers and should there be any tendency of the flying machine through any cause to descend below the predetermined altitude of flight the valves of the valve boxes will be operated to permit a greater or less amount of the compressed gas to return to the hydrogen gas containers to maintain the flying machine at the predetermined altitude of flight. The aneroid barometer will in this manner automatically control the altitude of flight within certain limits and different flying machines equipped with the present invention may be automatically maintained at different altitudes of flight so that they may travel in different directions without liability of collision. For instance, flying machines travelling in one direction, say east, may be automatically maintained at a predetermined elevation while those travelling in the opposite direction, namely west, may be caused to fly at a different altitude of flight and will maintain such altitude automatically. Also, machines flying north and south may be in like manner caused to operate at different altitudes from each other and from the machines flying east and west and the aneroid barometer will also indicate the elevation and prevent a flying machine from accidentally descending too low and becoming injured by anti-air craft guns when pursuing operations of war. The machine can be caused to travel at an altitude entirely beyond the range of such guns and the discharge of bombs and the like from machines will not materially affect the altitude of the same as any material change in the altitude will be automatically corrected by the aneroid barometer control.

Each slidable valve shutter or member is provided at its ends with valve stems 82 and 83 and are designed to be located at opposite sides of the passage way 62 in order that the valve boxes may be controlled by hand should occasion require and for this purpose the valve stem 82 is provided with a suitable handle or grip 84 located exteriorly of the valve box at one end thereof. The stem 82 forms the shank of the handle and extends through a suitable stuffing box 85 and is attached to a lug or ear 86 projecting upward from the valve shutter or member at one end thereof and formed integral with the same. The valve shutter or member is provided at the opposite end with a lug or ear 87 to which is secured the inner end of the valve stem 83 which extends through an electro-magnet 88 mounted on the valve box exteriorly of the end opposite that at which the stuffing box 85 is arranged and adapted to attract an armature 89 mounted on the valve stem 83 and located at the outer end of the electro-magnet. When the electro-magnet is energized by the operation of the aneroid barometer, the valve stem 83 will be moved inwardly and the slots of the slidable valve member or shutter will be carried in to register with the slots or openings of the valve seat which is preferably provided with the marginal attaching flange 90 and a central longitudinal reinforcing rib 91. The attaching flange 90 fits the interior of the valve box and is suitably secured to the walls thereof. The slidable valve shutter or member is yieldably urged to its closed position by a suitable spring 92 and is maintained in such closed position by the said spring when the electro-magnet is deenergized so that the valve will automatically close for confining the gas within the compression chamber when the electro-magnet 88 is deenergized. The valve will be normally closed and also maintained in such closed position while the pump is in operation and when the magnet is deenergized and when the valve is closed it may be manually operated to open the valve for releasing the gas by moving the handle or grip inwardly. The electro-magnet 88 and the electric motor are, as hereinafter fully described, arranged in separate circuits so that when one circuit is open the other circuit will be closed, and vice versa, the means permitting both of the circuits to remain open when such controlling means is at an intermediate point between the limits of its movement. Also by maintaining the valve in its open position against the action of the spring when the pump is in operation the pumping mechanism may be employed for circulating the gas through the hydrogen gas compression chamber for subjecting the gas uniformly to the heating means described in a companion application, should such heating of the gas be deemed necessary or advisable to maintain the required gas efficiency and the necessary lift of the same. In the said application containing the heating means, heated air is introduced into the intervening space between the outer skin or covering and in the inner skin at the bottom of the wings directly below the hydrogen gas compression chambers and by circulating the gas through the hydrogen gas compression chambers the gas may be uniformly heated and maintained at the required temperature by controlling the heating means.

The aneroid barometer 81 comprises a pump motor circuit 93 and a valve box circuit 94 to start the motors of the pumps when the flying machine ascends above the predetermined altitude of flight and to operate the valve boxes when the flying machine descends below the predetermined altitude of flight, and it comprises in its construction spaced resilient annularly corrugated discs 95 secured together at their periphery and having a vacuum space 96 between them and automatically expansible as the atmospheric pressure on the exterior of the discs decreases with the increase in the altitude and adapted also to be compressed by the atmospheric pressure as the altitude decreases to return the resilient discs to their normal spaced relation at sea level when the aneroid barometer is carried thereto. This movement of the expansible and compressible resilient discs is transmitted to a hand or pointer 97 of an indicator consisting of the said hand or pointer and the dial 98 having graduations 99 preferably arranged to indicate thousands of feet of altitude. The dial 98 is shown provided with thirty divisions numbered consecutively from 1 to 30 to indicate the altitude of thirty thousand feet and the divisions are sub-divided into tenths for designating hundredths of feet, but any other arrangement of graduations may of course be provided and the indicator will indicate approximately the altitude attained by the flying machine.

The connected and solid peripheral portions of the spaced discs are secured above the centers of the discs at spaced points to a bracket 100 consisting of a substantially oblong base portion 101 attached adjacent its ends to the said peripheral portions of the discs by suitable fastening devices 102 and provided with central upwardly extending standards 103 which project above the spaced discs and which are located at opposite sides of the latter. The bracket is provided at the front end with a vertical flange 104 to which is secured the lower portion of the graduated dial 98 and the latter is equipped at its center with an adjustable bearing 105 for the front or outer portion of a horizontal shaft or spindle 106 upon which the hand or pointer 97 is mounted. The hand or pointer 97 is preferably secured intermediate of its ends to the shaft to provide a balanced indicating member and enable it to be readily swung on its pivot without being affected by gravity and in order to prevent oscillation through vibration the shaft or spindle 106 on which the balance indicating hand or pointer is mounted is secured to the inner end of a coiled spring 107 which has its outer end attached to a pin 108 extending from the dial which is fixed with relation to the movable hand or pointer. This construction will afford a delicate and sensitive indicating device which at the same time will not be subject to vibrations so that the indications of the hand or pointer on the dial may be accurately read.

The inner or rear end of the shaft or spindle 106 is mounted in an adjustable bearing 109 of a bifurcated arm 110 of the bracket 100 and it is provided with a pinion 111 with which mesh upper and lower horizontal bars 112 and 113. The upper and lower rack bars 112 and 113, which are simultaneously movable in opposite directions are connected at their outer ends by suitable pivots 114 with upper relatively long arms of upright levers 115 fulcrumed near their lower ends at 116 between laterally projecting ears or lugs 116 of the sides of the base of the bracket 100. The arms 115 are sufficiently long so that the arc of movement of the pivots 114 are nearly horizontal so that the rack bars 112 and 113 require but slight movement or play to enable them to remain in mesh through a complete revolution of the shaft or spindle. The upper rack bar rests upon the spindle and the lower rack bar may be supported in any desired manner, preferably by a top connecting portion 117 of the bracket to retain it in mesh with the pinion. The rack bars operate in the opening or bifurcation of the arm 110 and in suitable grooves or ways 118 and 119 and a spring 120 may be employed to provide a yieldable seat for the lower rack bar 113.

The vertical levers are provided with pivots 120 which are mounted in adjustable bearing screws 121 threaded in the spaced lugs 116ª and the lower arms of the vertical levers 115 are connected by short horizontal links 122 with vertical arms 123 of bell crank levers 124 fulcrumed at their angles on suitable pivots 125 in slots or bifurcations 126 of an oblong frame or hanger 127 and having inwardly extending angularly related inclined arms 128 arranged in pairs and connected by pairs of links 129 with a vertical slidable stem 130. The frame or hanger 127 is provided at the top with a slotted or bifurcated flange 131 which receives the lower edges of the resilient discs 95 and which is suitably secured to the same. The angle or bell crank levers are slotted or bifurcated to form the pairs of arms 128 and to receive a central approximately triangular guide 132 consisting of a horizontal top bar or member 133 and inclined sides 134 and secured at the upper angles in the slots or bifurcations 126 by the pivots 125. The triangular guide is provided with vertical alined upper and lower tubular guides 135 and 136 which receive the upper and lower portions of the vertically slidable stem or member 130. The oblong frame or hanger has an enlarged top portion and a tapered lower portion in which is mounted a vertically adjustable stem 137 carrying a mercury cup 138 and threaded in an insulated sleeve 139 and equipped with an adjusting nut 140. The sleeve 139 which is flanged at the top is threaded for the reception of a lower nut 141 and suitable insulation is interposed between the sleeve, the upper flange, the nut and the bottom portion of the hanger or bracket. The threaded shank of the mercury cup is capable of vertical adjustment to arrange the mercury within the cup at different distances from a lower contact 143 carried by and forming a combination of the lower end of the stem or slidable member 130. By adjusting the cup the vertical slidable stem will be required to move the desired distance downwardly but the contact 143 is carried into the mercury for closing the valve box circuit.

The vertically slidable stem is equipped at its upper end with a mercury cup 144 which co-acts with a stationary adjustable contact 145 adapted to be raised and lowered to arrange it the desired distance from the mercury of the cup so that the slidable stem or member 130 will be required to move upwardly the desired distance to close the pump motor circuit. By this construction the flying machine will be enabled to operate within adjustable limits before closing either of the said circuits. Instead of employing the mercury cups and the co-acting contacts 143 and 145 any other well-known construction of contacts may of course be used. Any suitable means may be employed for adjustably connecting the upper stationary contact 145 with the top of the hanger or frame 127, and adjusting screw 146.

The compressible and expansible discs are centrally connected with the upper arms of the bell crank levers by means of rods 148 arranged horizontally and movable longitudinally in substantially a horizontal plane under the influence of the discs of the aneroid barometer to impart movement in the opposite direction to the bell crank levers to actuate the indicator and also the vertical slidable stem. The rods 148 are pivoted at 149 to the upper arms of the angle or bell crank levers and the arc of movement of the pivots is very slight and sufficient vertical play of the pivots is provided to permit this inward and outward movement of the horizontal rods 148 to prevent any binding or cramping of the parts in the operation of the aneroid barometer. When the discs move outwardly through a reduction of the atmospheric pressure on their exterior surfaces the upper arms of the angle levers will be moved outwardly and an outward movement will be transmitted to the horizontal rack bars 112 and 113 and an upward movement imparted to the vertically slidable stem 130. This will cause the indicating hand to travel around the graduated dial and the upper mercury cup to be carried toward the stationary co-acting contact. The upper and lower contacts may be set so that the upper circuit will be closed when the flying machine ascends beyond the predetermined altitude of flight to check such upward movement and to cause the flying machine to descend automatically to such predetermined altitude. When the flying machine descends below such predetermined altitude the lower circuit will be closed and the valves of the valve boxes operated to cause the compressed hydrogen gas to be returned to the gas containers for causing the machine to ascend. While the flying machine is travelling between the limits of its predetermined altitude of flight the upper and lower circuits will remain open and the pumps will remain stationary and the valve boxes closed. Any suitable source of current supply may be provided for the circuits and any form of circuit breakers may be provided for throwing the automatic controlling mechanism out of operation until the flying machine has ascended to the desired elevation and the contacts adjusted for maintaining such altitude of flight.

What is claimed is:—

1. A gas control of the class described including a gas bag or container, a compression chamber, means for removing the gas from the gas bag or container and compressing the same within the said chamber and for returning the gas to the gas bag or container, and means for automatically controlling the gas for maintaining the flying machine at a predetermined altitude.

2. A gas control of the class described including a gas bag or container, a compression chamber, means for removing the gas from the gas bag or container and compressing the same within the said chamber, means for returning the compressed gas to the gas bag or container, and means for automatically controlling the gas for maintaining the flying machine at a predetermined altitude.

3. A gas control of the class described including a gas bag or container, a collapsible and inflatable compressed gas chamber, means for moving gas from the gas bag or container and for compressing such gas into the compression chamber, an inflatable air chamber located within the gas bag or container and means for introducing air into the air chamber.

4. A gas control of the class described including a gas bag or container, a collapsible and inflatable compressed gas chamber, means for moving gas from the gas bag or container and for compressing such gas into the compression chamber, an inflatable air chamber located within the gas bag or container, means for introducing air into the air chamber, means for returning the compressed gas to the gas bag or container and means for releasing the air from the air chamber.

5. A gas control of the class described including a gas bag or container, an inflatable gas compression chamber located within the gas bag or container, an inflatable air chamber also located within the gas bag or container, means for pumping gas from the gas bag or container into the compression chamber, means for introducing air into the air chamber, and means for automatically controlling the gas for maintaining a flying machine at a predetermined altitude.

6. A gas control of the class described including a gas bag or container, an inflatable gas compression chamber located within the gas bag or container, an inflatable air chamber also located within the gas bag or container, means for pumping gas from the gas bag or container into the compression chamber, means for pumping air into the air chamber, and means for returning the gas from the compression chamber to the gas bag or container and for releasing the air and removing the same from the air chamber.

7. A gas control of the class described including a gas bag or container, a flexible partition arranged within the gas bag or container and forming an inflatable and collapsible gas compression chamber, and means for introducing gas under pressure from the gas bag or container into the said compression chamber and for returning the compressed gas to the gas bag or container.

8. A gas control of the class described including a gas bag or container provided with flexible diaphragms or partitions forming an inflatable compressed gas chamber and an inflatable air chamber, and means for introducing gas under pressure from the gas bag or container into the gas compression chamber and for also introducing compressed air into the air chamber.

9. A gas control of the class described including a gas bag or container provided with flexible diaphragms or partitions forming an inflatable gas compression chamber and an inflatable air chamber and adapted to lie against the walls of the gas bag or container when the said chambers are deflated, and means for pumping gas from the gas bag or container into the gas compression chamber and for pumping air into the air chamber.

10. A gas control of the class described including a gas bag or container provided with flexible diaphragms or partitions forming an inflatable gas compression chamber and an inflatable air chamber and adapted to lie against the walls of the gas bag or container when the said chambers are deflated, means for pumping gas from the gas bag or container into the gas compression wheels mounted on the crank shafts and chamber and for pumping air into the air chamber, and means for returning the compressed gas to the gas bag or container and for deflating the air chamber.

11. A gas control of the class described including a gas bag or container provided with flexible diaphragms or partitions forming an inflatable and collapsible gas compression chamber and arranged to lie against the walls of the gas bag or container when the said chamber is deflated, and means for pumping gas from the gas bag or container into the compression chamber and for returning the compressed gas to the said gas bag or container.

12. A gas control of the class described including a gas bag or container, a gas compression chamber, an air chamber, pumps for compressing gas from the gas bag or container into the compression chamber and for introducing air under pressure into the air chamber, and means for simultaneously operating the said pumps.

13. A gas control of the class described including a gas bag or container, a gas compression chamber, an air chamber, pumps for compressing gas from the gas bag or container into the compression chamber and for introducing air under pressure into the air chamber, means for simultaneously operating the said pumps, valve mechanism for controlling the return of gas from the compression chamber to the gas bag or container and means for removing the air from the air chamber when the gas is returned from the compression chamber to the gas bag or container.

14. A gas control of the class described including a body having a gas bag or container and provided with wings, said body being also provided at the wings with flexible partitions or diaphragms extending across the wings and forming an inflatable gas compression chamber and an inflatable air chamber and adapted to lie against the walls of the gas bag or container at the bottom of the wings when the said chambers are deflated and means for pumping gas from the gas bag or container into the gas compression chamber and for pumping air into the air chamber, and means for releasing the air and gas from the said chambers and for returning the compressed gas to the gas bag or container.

15. A gas control of the class described including a gas bag or container, a gas compression chamber, an air chamber, said chambers being collapsible against a wall of the gas bag or container, a gas pump connected with the gas bag or container and with the gas compression chamber, an air pump connected with the air chamber, a motor and means for connecting the pumps with the motor for operating the said pumps.

16. A gas control of the class described including opposite gas bags or containers, gas compression chambers, opposite pumps connected with the gas bags or containers and with the gas compression chambers, an electric motor having a shaft extending in opposite directions from the motor, and gearing for connecting the extended portions of the motor shaft with the pumps.

17. A gas control of the class described, including opposite gas bags or containers, compression chambers, opposite gas pumps connected with the gas bags or containers and with the gas compression chambers, an electric motor having a shaft extending in opposite directions and provided with right and left hand worms, worm wheels meshing with the said worms, and means for transmitting motion from the worm wheels to the pumps.

18. A gas control of the class described, including opposite gas bags or containers, gas compression chambers, centrally arranged gas pumps connected with the gas bags or containers and with the gas compression chambers, an electric motor having a shaft extending in opposite directions from the motor and provided with right and left hand worms, crank shafts, worm wheels mounted on the crank shafts and meshing with the worms, and connecting rods connected with the crank shafts and with the pumps for operating the latter.

19. A gas control of the class described including a gas bag or container, a gas compression chamber, a vibratory pump connected with the gas bag or container and with the compression chamber, a worm, a worm wheel meshing with the worm and having a crank element connected with the vibratory pump, a motor for actuating the worm, and means for automatically operating the motor for maintaining a flying machine at a predetermined altitude.

20. A gas control of the class described including a gas bag or container, a gas compression chamber, an air chamber, vibratory gas and air pumps connected respectively with the gas chamber and with the gas compression chamber and air bag or container, a motor having a shaft provided with right and left hand worms, worm wheels meshing with the said worms and means for transmitting motion from the worm wheels to the said pumps.

21. A gas control of the class described including a gas bag or container, an air chamber, a gas compression chamber and means for pumping gas from the gas bag or container into the gas compression chamber and for introducing air under pressure into the air chamber, said means comprising air and gas pumps arranged in pairs and mounted for vibratory movement, opposite crank shafts provided with cranks, worm wheels mounted on the crank shafts and having crank elements, means for connecting the crank shafts and the crank elements with the pumps and a motor having a shaft provided with worms meshing with the worm wheels.

22. A gas control of the class described including a gas bag or container, a gas compression chamber, means for pumping gas from the gas bag or container into the compression chamber, a valve connected with the gas compression chamber and with the gas bag or container for controlling the return of the gas to the latter, and means for automatically controlling the gas for maintaining a flying machine at a predetermined altitude.

23. A gas control of the class described including a gas bag or container, a gas compression chamber, means for pumping gas from the gas bag or container into the compression chamber, a valve box communicating with the gas bag or container and with the gas compression chamber and provided with a valve seat, a slidable shutter or valve member cooperating with the seat for controlling the return of the compressed gas to the gas bag or container and means for automatically controlling the gas for maintaining a flying machine at a predetermined altitude.

24. A gas control of the class described including a gas bag or container, a gas compression chamber, means for pumping gas from the gas bag or container into the compression chamber, a valve box connected with the gas compression chamber and with the gas bag or container and provided with a valve seat having slots arranged at intervals, a slidable valve shutter or member also provided with slots arranged to be moved into and out of register with the slots of the valve seat, means for manually operating the valve, and means for automatically controlling the gas for maintaining a flying machine at a predetermined altitude.

25. A gas control of the class described including a gas bag or container, a gas compression chamber, means for pumping gas from the gas bag or container into the compression chamber, a valve box having a partition forming a valve seat and dividing the valve box into upper and lower chambers and having slots or openings arranged at intervals, means for connecting the chambers of the valve box with the gas compression chamber and with the gas bag or container and a slidable shutter or valve member mounted in the valve box and provided with means for controlling the said slots or openings of the valve seat.

26. A gas control of the class described including a gas bag or container, a gas compression chamber, means for pumping gas from the gas bag or container into the compression chamber, a valve box connected with the gas bag or container and with the gas compression chamber and having a valve seat and provided also with a slidable shutter or valve member for controlling the passage of air or gas through the valve box, a handle connected with the valve shutter or member and located exteriorly of one end of the valve box for manual operation, a stem extending from the opposite end of the valve box and means connected with the said stem for actuating the said shutter or member.

27. A gas control of the class described including a gas bag or container, a gas compression chamber, means for pumping gas from the gas bag or container into the gas compression chamber, valve mechanism for controlling the return of the gas from the compression chamber into the gas bag or container, and means for automatically operating the valve mechanism and the pumping means for maintaining a flying machine at a predetermined altitude of flight.

28. A gas control of the class described including a gas bag or container, a gas compression chamber, means for pumping gas from the gas bag or container into the gas compression chamber, valve mechanism for controlling the return of the gas from the compression chamber into the gas bag or container, an aneroid barometer and means controlled by the same for operating the pumping means and the valve mechanism for automatically maintaining a flying machine at a predetermined altitude of flight.

29. A gas control of the class described including a gas bag or container, a gas compression chamber, an air chamber, means for pumping gas from the gas bag or container into the compression chamber and for introducing air under pressure into the air chamber, valve mechanism for controlling the return of gas from the compression chamber to the gas bag or container and for releasing the air from the air chamber and means for automatically controlling the pumping means in the valve mechanism for maintaining the flying machine at a predetermined altitude of flight.

30. A gas control of the class described including a gas bag or container, a gas compression chamber, an air chamber, means for pumping gas from the gas bag or container into the compression chamber and for introducing air under pressure into the air chamber, valve mechanism for controlling the return of gas from the compression chamber to the gas bag or container and for releasing the air from the air chamber, an aneroid barometer, and means controlled by the aneroid barometer for automatically operating the pumping means and the valve mechanism for maintaining a flying machine at a predetermined altitude of flight.

31. A gas control of the class described including a gas bag or container, a gas compression chamber, an air chamber, means for pumping gas from the gas bag or container into the compression chamber and for introducing air under pressure into the air chamber, valve mechanism for controlling the return of gas from the compression chamber to the gas bag or container and for releasing the air from the air chamber, separate electric circuits having means for operating the pumping means and the valve mechanism and an aneroid barometer having separate circuit closing means for opening and closing the said circuits for automatically maintaining a flying machine at a predetermined altitude of flight.

32. A gas control of the class described including a gas bag or container, a gas compression chamber, an air chamber, means for pumping gas from the gas bag or container into the compression chamber and for introducing air under pressure into the air chamber, valve mechanism for controlling the return of gas from the compression chamber to the gas bag or container and for releasing the air from the air chamber, separate electric circuits having means for separating the pumping means and the valve mechanism, and an aneroid barometer having separate sets of contacts for opening and closing the said circuits for automatically maintaining a flying machine at a predetermined altitude of flight.

33. A gas control of the class described including a gas container, a gas compression chamber, means for pumping gas from the gas bag or container into the gas compression chamber having an electric motor, valve mechanism for controlling the return of the gas from the chamber to the gas bag or container provided with an electro-magnet, an aneroid barometer and circuits controlled by the aneroid barometer and connected with the motor and the electro-magnet for automatically operating the pumping means and the valve mechanism for maintaining a flying machine at a predetermined altitude of flight.

34. A gas control of the class described including a gas bag or container, a gas compression chamber, an air chamber, pumping mechanism for pumping gas from the gas bag or container into the compression chamber and for introducing air under pressure into the said air chamber, said pumping mechanism having an electric motor, valve mechanism for controlling the return of gas from the gas compression chamber to the gas container and for releasing the air from the air chamber, said valve mechanism having an electro-magnet, separate circuits connected with the said motor, and electro-magnet and an aneroid barometer provided with means for opening and closing said circuits to maintain a flying machine automatically at a predetermined altitude of flight.

35. A gas control of the class described including a gas bag or container, a gas compression chamber, an air chamber, pumping mechanism for pumping gas from the gas bag or container into the compression chamber and for introducing air under pressure into the said air chamber, said pumping mechanism having an electric motor, valve mechanism for controlling the return of gas from the gas compression chamber to the gas container and for releasing the air from the air chamber, said valve mechanism having an electro-magnet, separate circuits connected with the said motor and electro-magnet, fixed and movable contacts arranged in pairs in the said circuits, and an aneroid barometer having means connected with the movable contacts for actuating the same to open and close the said circuits to maintain a flying machine at a predetermined altitude of flight.

36. A gas control of the class described including a gas bag or container, a gas compression chamber, an air chamber, pumping mechanism for pumping gas from the gas bag or container into the compression chamber and for introducing air under pressure into the said air chamber, said pumping mechanism having an electric motor, valve mechanism for controlling the return of gas from the gas compression chamber to the gas container and for releasing the air from the air chamber, said valve mechanism having an electro-magnet, separate circuits connected with the said motor and electro-magnet, fixed and movable contacts arranged in pairs in the said circuits, and an aneroid barometer having a movable member connected with the movable contacts, said aneroid barometer being also provided with means for actuating the movable member to open one of the circuits and close the other circuit.

37. A gas control of the class described including a gas bag or container, a gas compression chamber, an air chamber, pumping mechanism for pumping gas from the gas bag or container into the compression chamber and for introducing air under pressure into the said air chamber, said pumping mechanism having an electric motor, valve mechanism for controlling the return of gas from the gas compression chamber to the gas container and for releasing the air from the air chamber, said valve mechanism having an electro-magnet, separate circuits connected with the said motor and electro-magnet, fixed and movable contacts arranged in pairs in the said circuits, and an aneroid barometer comprising a slidable member carrying the movable contacts and means for transmitting motion to the slidable member for opening and closing the said circuits.

38. A gas control of the class described including a gas bag or container, a compressed gas chamber or receptacle, means for removing the gas from the gas bag or container and compressing the same within said chamber and for returning the gas to said gas bag or container, and means for automatically controlling the gas for maintaining a flying machine at a predetermined altitude including an aneroid barometer comprising spaced expansible and compressible members adapted to be operated on by atmospheric pressure, circuit closing means, and means actuated by the said members for operating the circuit closing means.

39. A gas control of the class described including a gas bag or container, a compressed gas chamber or receptacle, means for removing the gas from the gas bag or container and compressing the same within said chamber and for returning the gas to said gas bag or container, and means for automatically controlling the gas for maintaining a flying machine at a predetermined altitude including an aneroid barometer comprising spaced expansible and compressible members adapted to be operated on by atmospheric pressure, circuit closing means, means actuated by the said members for operating the circuit closing means, and an indicator also connected with and actuated by the said members for indicating the altitude.

40. A gas control of the class described including a gas bag or container, a compressed gas chamber or receptacle, means for removing the gas from the gas bag or container and compressing the same within said chamber, and for returning the gas to said gas bag or container, and means for automatically controlling the gas for maintaining a flying machine at a predetermined altitude including an aneroid barometer comprising spaced expansible and compressible members adapted to be operated on by atmospheric pressure, a slidable member, levers for transmitting motion from the said members to the slidable member, and a circuit closing device operated by the slidable member.

41. A gas control of the class described including a gas bag or container, a compressed gas chamber or receptacle, means for removing the gas from the gas bag or container and compressing the same within said chamber, and for returning the gas to said gas bag or container, and means for automatically controlling the gas for maintaining a flying machine at a predetermined altitude including an aneroid barometer comprising spaced expansible and compressible members adapted to be operated on by atmospheric pressure, a slidable member, levers for transmitting motion from the said members to the slidable member, and a circuit closing device operated by the slidable member, and an indicator also operated by the said members for indicating the altitude.

42. A gas control of the class described including a gas bag or container, a compressed gas chamber or receptacle, means for removing the gas from the gas bag or container and compressing the same within said chamber, and for returning the gas to said gas bag or container, and means for automatically controlling the gas for maintaining a flying machine at a predetermined altitude including an aneroid barometer comprising spaced expansible and compressible discs adapted to be acted on by atmospheric pressure, levers connected with the discs, and a circuit controlling device operated by the said levers.

43. A gas control of the class described including a gas bag or container, a compressed gas chamber or receptacle, means for removing the gas from the gas bag or container and compressing the same within said chamber, and for returning the gas to said gas bag or container, and means for automatically controlling the gas for maintaining a flying machine at a predetermined altitude including an aneroid barometer comprising spaced expansible and compressible discs adapted to be acted on by atmospheric pressure, levers connected with the discs, a circuit controlling device operated by the said levers, and an indicator for designating the altitude also actuated by the said levers.

44. A gas control of the class described including a gas bag or container, a compressed gas chamber or receptacle, means for removing the gas from the gas bag or container and compressing the same within said chamber, and for returning the gas to said gas bag or container, and means for automatically controlling the gas for maintaining a flying machine at a predetermined altitude including spaced, expansible and compressible corrugated resilient discs adapted to be operated on by atmospheric pressure, levers connected with and actuated by the discs, a slidable member connected with and adapted to be operated by the said levers, and separate circuit closing devices having movable elements carried by the said slidable member for opening and closing a pair of circuits.

45. A gas control of the class described including a gas bag or container, a compressed gas chamber or receptacle, means for removing the gas from the gas bag or container and compressing the same within said chamber and for returning the gas to said gas bag or container, and means for automatically controlling the gas for maintaining a flying machine at a predetermined altitude including spaced, expansible and compressible corrugated resilient discs adapted to be operated on by atmospheric pressure, rods or members extending from the said discs, bell crank levers connected with the said rods or members and actuated by the discs, a slidably mounted member connected with the said levers, pairs of contacts arranged at the ends of the slidable member and controlled by the same.

46. A gas control of the class described including a gas bag or container, a compressed gas chamber or receptacle, means for removing the gas from the gas bag or container and compressing the same within said chamber and for returning the gas to said gas bag or container, and means for automatically controlling the gas for maintaining a flying machine at a predetermined altitude including spaced, expansible and compressible corrugated resilient discs adapted to be operated on by atmospheric pressure, rods or members extending from the said discs, bell crank levers connected with the said rods or members and actuated by the discs, a slidably mounted member connected with the said levers, pairs of contacts arranged at the ends of the slidable member and controlled by the same, and an indicator for designating the altitude connected with and actuated by the said levers.

47. A gas control of the class described including a gas bag or container, a compressed gas chamber or receptacle, means for removing the gas from the gas bag or container and compressing the same within said chamber and for returning the gas to said gas bag or container, and means for automatically controlling the gas for maintaining a flying machine at a predetermined altitude including an aneroid barometer comprising spaced, compressible and expansible discs, a bracket mounted upon the discs and provided with a dial, a shaft or spindle carried by the bracket and having a hand or pointer cooperating with the said dial for indicating the altitudes, a frame connected with the discs at the bottom thereof, a guide mounted in the frame, a reciprocatory member arranged in the said guides, angle levers fulcrumed on the frame at opposite sides of the discs and connected with the latter and with the slidable member, separate upright levers connected with the angle levers, means actuated by the upright levers for operating the hand or indicator, and circuit closing means operated by the said slidable member.

48. A gas control of the class described including a gas bag or container, a compressed gas chamber or receptacle, means for removing the gas from the gas bag or container and compressing the same within said chamber and for returning the gas to said gas bag or container, and means for automatically controlling the gas for maintaining a flying machine at a predetermined altitude including an aneroid barometer comprising expansible and compressible members, a frame located beneath the said members and connected with the same, levers located at opposite sides of the frame and fulcrumed thereon, a guide mounted in the frame and having spaced guiding means, a slidable member operating in the spaced guiding means, links connecting the slidable member with the said levers, and members also connecting the said levers with the discs.

49. A gas control of the class described including a gas bag or container, a gas compression chamber, means for pumping gas from the gas container into the compression chamber, valve mechanism for controlling the return of gas from the gas compression chamber to the gas container, resilient, compressible and expansible members arranged to be operated on by atmospheric pressure, electric circuits having circuit closing devices and provided with means for operating the pumping means and the valve mechanism and means actuated by the said expansible and compressible members for operating the circuit closing means to maintain a flying machine at a predetermined altitude of flight.

50. A gas control of the class described including a gas bag or container, a gas compression chamber, means for pumping gas from the gas container into the compression chamber, valve mechanism for controlling the return of gas from the gas compression chamber to the gas container, resilient, compressible and expansible members arranged to be operated on by atmospheric pressure, electric circuits having circuit closing devices and provided with means for operating the pumping means and the valve mechanism and means actuated by the said expansible and compressible members for operating the circuit closing means to maintain a flying machine at a predetermined altitude of flight, and an indicator also actuated by the said expansible and compressible members for indicating the altitude.

51. A gas control of the class described including a gas bag or container, a gas compression chamber, means for pumping gas from the gas container into the compression chamber, valve mechanism for controlling the return of gas from the gas compression chamber to the gas container, resilient, compressible and expansible members arranged to be operated on by atmospheric pressure, electric circuits having circuit closing devices and provided with means for operating the pumping means and the valve mechanism, adjustable means actuated by the said expansible and compressible members for operating the circuit closing means to permit a flying machine to fly within certain predetermined limits without operating the pumping means or the valve mechanism.

52. A gas control of the class described, including a gas bag or container, means for compressing gas from the container to reduce the lifting power of the gas of a flying machine, means for releasing the compressed gas to increase the lifting power of the gas bag or container, and automatic means for controlling the gas for maintaining the flying machine at a predetermined altitude.

53. A gas control of the class described including a gas bag or container, means for compressing gas from the container to reduce the lifting power of the gas of a flying machine, means for releasing the compressed gas to increase the lifting power of the gas bag or container, a chamber collapsible against the wall of the gas bag or container, and means for introducing aeriform fluid within the said chamber when the said gas is compressed, whereby the cubic contents of the gas bag or container may be maintained substantially constant, and means for automatically controlling the gas and air for maintaining the flying machine at a predetermined altitude.

In testimony whereof I affix my signature.

THOMAS M. FINLEY.